United States Patent [19]

Yasukawa et al.

[11] Patent Number: 4,976,984
[45] Date of Patent: Dec. 11, 1990

[54] EDIBLE OIL/FAT COMPOSITIONS

[75] Inventors: Takuji Yasukawa; Daisuke Yasumura; Kimiko Yamasawa; Yukitaka Tanaka; Tsutomu Nishide, all of Ibaraki, Japan

[73] Assignee: Kao Corporation, Tokyo, Japan

[21] Appl. No.: 327,343

[22] Filed: Mar. 22, 1989

[30] Foreign Application Priority Data

Jan. 17, 1989 [JP] Japan ................................. 1-8151

[51] Int. Cl.$^5$ ............................................. A23D 7/00
[52] U.S. Cl. ...................................... 426/602; 426/33
[58] Field of Search ................ 426/601, 602, 605, 33, 426/35, 47, 607

[56] References Cited

U.S. PATENT DOCUMENTS

| | | | |
|---|---|---|---|
| 3,260,606 | 7/1966 | Azuma | 426/47 |
| 4,018,806 | 4/1977 | Wyness | 426/607 |
| 4,119,564 | 10/1978 | Van Dam | 426/605 |

FOREIGN PATENT DOCUMENTS

| | | | |
|---|---|---|---|
| 1355967 | 6/1974 | European Pat. Off. | |
| 11054 | 1/1987 | Japan | 426/601 |
| 63-302929 | 12/1988 | Japan | 426/33 |

OTHER PUBLICATIONS

Swern 1964 Bailey's Industrial Oil and Fat Products Interscience Publishers, New York, p. 5.
Garr 1971 Lipid Briochemistry Cornell University Press, New York, pp. 126–129, 140–141.

Primary Examiner—Carolyn Paden
Attorney, Agent, or Firm—Flynn, Thiel, Boutell & Tanis

[57] ABSTRACT

An edible oil and fat composition comprises a phospholipid and a glyceride mixture comprising 5 to 100 percent by weight of a diglyceride. The phospholipid is a decomposition product of natural lecithin. It is stable and suitable for food and a cooking oil.

13 Claims, No Drawings

EDIBLE OIL/FAT COMPOSITIONS

BACKGROUND OF THE INVENTION

1. Field of the Invention

The present invention relates to edible oil/fat compositions (the in this description term "oil/fat composition(s)" shall mean composition(s) containing oil and/or fat, as principal component, and other desired components, and more particularly to edible oil/fat compositions comprising a diglyceride-containing glyceride mixture and a phospholipid having a specified composition, and thus having the advantages of good stability against oxidation and heat which may occur during cooking, for example, deep- and pan-frying, roasting, and baking, and of providing little greasy or oily distastefulness and no heavy feeling in the stomach when taken in a raw state, as such when contained in salad dressing, mayonnaise, or the like.

2. Description of the Prior Art

In these days there are used various edible oils most of which include soybean oil, rapeseed oil, corn oil, cotton seed oil, safflower oil, sunflower oil, and sesame oil either alone, respectively, or in combination, in the form of a mixture or composition. More recently, there is a tendency for consumers to like light or soft taste and flavor (referred to as taste/flavor hereinafter) rather than heavy or rich foods. Because it is difficult to mix with digestive juice compared with other essential nutrients, such as, proteins and carbohydrates, the fats and oils tend to stay for a longer time in the digestive tract, and this is considered a cause of physiological discomforts, such as, a heavy feeling in the stomach caused by taking largeamount greasy or oily food, but they are very important for making the taste and appearance better. An actual problem with oils and fats therefore resides in the incompatibility between their effect which may cause physiological discomforts, such as greasy distastefulness and a heavy, feeling in the stomach, and their effect of improving the taste/flavor and appearance.

In addition, edible oils and fats plays important role for cooking from the aspect of function, for example, in order to prevent food material from burning and sticking to cooking utensils, baking molds, top plates, for instance, during the baking cakes or breads, or frying in a pan.

On the other hand, there are a number of surface active agents used as mold-releasing agents for use in cooking, for example, baking sponge cakes or frying eggs, so as to prevent dough or eggs from burning and sticking and above all, lecithins are known as specifically effective for this purpose. Thus vegetable oils containing lecithin(s) added thereto are used as mold releasing oils. Lecithins also have a anti-spattering effect for cooking, and for this reason, lecithin-added oils are available on the market as "reduced-spattering oil for roasting on iron plate".

The term "lecithins" refers herein to phospholipid mixtures containing, as major gradients, phosphatidyl choline, phosphatidyl ethanolamine, and so on. Typical lecithins are obtained from soybean or egg yolk by extraction and purification.

Natural lecithins including lecithins from soybean and egg yolk are labile and, even if protected by oil or fat, turn black brown (browning phenomenon) as the result of heating. The decomposition and denaturation products emit a bad smell and an offensive odor, resulting in an impairment in the taste/flavor of food. For this reason, the uses and amounts of lecithins are limited at present. For the purpose of overcoming the difficulty with respect to lecithins, some approaches have been made, for example modification, such as hydroxylation, of lecithins (U.S. Pat. No. 3,661,605), and the use of specified HLB lecithins (U.S. Pat. No. 3,896,975). Japanese patent publication B 61-48520, Japanese patent publication A 54-126 206 and Japanese patent publication A 54-127 408 disclose the use of mixtures of lecithin with salts of organic acids and amino acids. The problem is not substantially solved.

SUMMARY OF THE INVENTION

Presently-used edible oils, such as, salad oil, comprise, as major constituents, triglycerides each being an ester of three fatty acid moieties and glycerol, although their fatty acid moieties are different depending on the source oils. Triglycerides are subjected to hydrolysis by the action of digestive enzymes in the digestive tract to be converted into glycerides greater in polarity (high hydrophilic), that is, di- and monoglycerides, and, after all, they are probably absorbed through the epithelial cells of the small intestine. (A. P. Hofmann & B. Borgstroem ('64), J. Clin. Invest. 43(8), 24).

We have made a detailed study on glyceride mixtures and, to our surprise, found that when a specified glyceride, i.e. a diglyceride, is contained in them, the ingestion of substantially more oil containing them, compared with common salad oils, induced no peculiar heavy feeling in the stomach which might otherwise have after taking a highly greasy or oily food, while they have similar properties to those of common salad oils, and they can be used conveniently as oils for general cooking. In addition, to our surprise, we found that dishes containing such edible oil/fat compositions, even in a considerably much larger amount, gave little oily distastefulness. Thus they may be said to be edible oils appropriate for current tastes.

The inventors made a further study on ameliorating the shortcomings of the aforesaid conventional oils for cooking, for instance, smoking on heating and unwanted taste and flavor, thus to provide satisfactory edible oil compositions for cooking.

In our further study, it was demonstrated, as described above, that the major constituents of natural lecithins (such as soybean lecithin and egg yolk lecithin), which were nitrogen-containing compounds of phospholipids, such as phosphatidyl choline (PC) and phosphatidyl ethanolamine (PE), are so heat labile that they readily become colored and emit a bad smell on heating. In addition, it was found that treatment of these natural lecithins with enzymes such as phospholipase D and phospholipase $A_2$, fractionation, and so on, to reduce the contents of PC and PE and on the other hand increase the contents of phosphatidic acid (PA), lysophosphatidic acid (LPA), phosphatidyl glycerol (PG), and phosphatidyl inositol (PI) to specified or higher levels, resulted in markedly reduced coloration and emitting of bad smells while still keeping the good mold-releasing effect and superior anti-spattering effect. In this way the present invention has been accomplished.

An edible oil and fat composition of the invention comprises a phospholipid and a glyceride mixture comprising 5 to 100 percent by weight of a diglyceride. It is preferred that the composition comprises 0.1 to 30 percent by weight of a phospholipid and 20 to 99.9 percent by weight of a glyceride mixture comprising 5 to 100 percent by weight of a diglyceride.

A preferable phospholipid is a decomposition product of natural lecithin. It is stable and suitable for use in foods and cooking oils.

The phospholipid to use in the invention has a lower nitrogen content than its raw material including choline, ethanolamine and serine. It is prevented from coloring, fuming and emitting bad smells during use.

It is preferable that the phospholipid is a product mixture obtained by decomposing natural lecithin with use of an enzyme.

A preferable phospholipid has the below shown formula (I) in which A is hydrogen or R2, R1 and R2 each are an aliphatic acyl group, saturated or unsaturated, having 8 to 24 carbon atoms, X1 is selected from the group consisting of base residues of choline, ethanolamine, serine, inositol and glycerol, hydrogen, an alkali metal, an alkaline earth metal, a trivalent metal and ammonium, and X2 is selected from the group consisting of hydrogen, an alkali metal, an alkaline earth metal, a trivalent metal and ammonium. The phospholipid has a weight ratio of the phospholipid having no nitrogen in X1 and X2 to the phospholipid having nitrogen in X1 and X2 at a value of 1.0 or more.

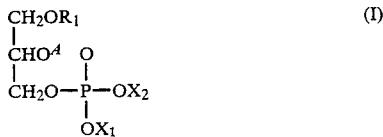

Preferred phospholipids include PA (X1 is hydrogen and X2 is hydrogen), a salt thereof, LPA (X1, X2 and A are hydrogens), a salt thereof, PG (X1 is hydrogen and X2 is —CH2CHOHCH2OH) and PI (X1 is hydrogen and X2 is inositol).

A more preferable phospholipid has a weight ratio of nitrogen to phosphorus in the range between zero and 0.20.

Another preferable phospholipid contains phosphatidic acid (PA) and/or a phosphatidic acid salt and lysophosphatidic acid (LPA) and/or a lysophosphatidic acid salt and the weight ratio of the sum total of the phosphatidic acid, a salt thereof, lysophosphatidic acid and a salt thereof to the sum total of phosphatidyl choline (PC) and phosphatidyl ethanolamine (PE) at a value of 1.0 or above.

The glyceride to use in the invention has aliphatic acid residues having 8 to 24 carbon atoms, being either saturated or unsaturated, straight chain or branched. A straight one, saturated or unsaturated, is preferable.

A preferable glyceride mixture comprises from 5 to 99.9 percent by weight of the diglyceride.

It is preferable that
(a) the glyceride mixture comprises monoglycerides, diglycerides and triglycerides,
(b) a weight ratio of the diglyceride to the monoglyceride ranges from 5:1 to 990:1 and
(c) the aliphatic acid (acyl) moieties in the glycerides have 8 to 24 carbon atoms.

It is more preferable that, in addition to the above (a), (b) and (c), the aliphatic acid moiety comprises 70 percent by weight, or more, of unsaturated aliphatic acid moieties and
(d) the diglycerides contains 40 percent by weight, or less, of diglycerides having unsaturated and saturated aliphatic acid moieties and 5 percent by weight or less of diglycerides having two saturated aliphatic acid moieties.

Instead of the above preferable condition (d), there can be used the condition (d') in which the diglycerides contain 40 percent by weight, or more, of diglycerides having unsaturated and saturated aliphatic acid moieties and 5 percent by weight, or more, of diglycerides having two saturated aliphatic acid moieties.

The composition may further comprise 0.1 to 50 percent by weight of ethyl alcohol.

DETAILED DESCRIPTION OF THE INVENTION

It therefore is the principal object of the present invention to provide edible oil/fat compositions comprising, in combination, a diglyceride-containing mixture and a phospholipid of a specified composition, and having superior characteristics that it leaves no greasy or oily distastefulness after ingestion, has good mold-releasing effect and superior anti-spattering effect, and markedly reduces the coloring and emitting of bad smells caused by heating.

Phospholipids, according to the present invention, can be obtained, for example, by two methods described in the following, although they are not limited to these. The first method is: natural lecithins, such as, soybean lecithin, are subjected to the action of a catalyst, such as, phospholipase D or A2, to decompose selectively phosphatidyl choline and phosphatidyl ethanolamine, thus reducing the contents of these components, and, at the same time, increasing the contents of phosphatidic acid and/or of its salts with alkali metal, alkaline earth metal, trivalent metal and ammonium radical, and the contents of lysophosphatidic acid and/or of its salts with alkali metal, alkaline earth metal, trivalent metal and ammonium radical. The second method is: natural lecithins are subjected to transphosphatidilation in the presence of a catalyst, phospholipase D, to reduce the contents of phosphatidyl choline (PC), phosphatidyl ethanolamine (PE), and phosphatidyl serine (PS), and increase the contents of phosphatidyl glycerol (PG) and phosphatidyl inositol (PI) in the lecithins.

Suitable phospholipids for use in the present invention are those containing phosphatidic acid and/or its salt and lysophosphatidic acid and/or its salt in a ratio of 1.0 or more to the sum of the amounts of phosphatidyl choline and phosphatidyl ethanolamine.

Free phosphatidic acid and also its salts can be used in the present invention, and the suitable salts include alkali metal salts, such as, sodium phosphatidate and potassium phosphatidate; alkaline metal salts, such as, calcium phosphatidate and magnesium phosphatidate; trivalent metal salts, such as, aluminum phosphatidate; and ammonium phosphatidate; and monovalent metal (such as sodium and potassium) salts are especially favorable. Suitable fatty acids as constituents of phosphatidic and lysophosphatidic acids include saturated or unsaturated fatty acids having 6 to 20 carbon atoms, and unsaturated fatty acids having 16 to 18 carbon atoms are the most favorable.

Phosphatidic and/or lysophosphatidic acids may be used alone and as mixtures of them. It, however, is favorable to use phospholipids in which the phosphatidyl choline and phosphatidyl ethanolamine, etc., are not all separated and remain, and the content of phosphatidic acid and/or lysophosphatidic acid is 1.0 or more to the sum of the amounts of phosphatidyl choline and phosphatidyl ethanolamine, and among all the summed remaining content is 0.01 to 20% by weight in the phospholipids because the use of these phospholipids for cooking effects reduction of oily distastefulness and provides better taste/flavor.

Suitable phospholipids containing PG and PI for use in the present invention are of a composition in which the N/P ratio ranges from 0 to 0.20, and the weight ratio of PG+PI to PC+PE+PS is 1.0 or more.

Suitable fatty acids as constituents of phospholipids containing PG and PI are of the types as described above. Phospholipids having the types of fatty acids can be obtained from vegetable seed-derived lecithins, especially those derived from soybean, rapeseed and sunflower.

Besides it is suitable to handle the above-mentioned content of phospholipids as the content of acetone-insoluble matter, which can be regarded as a criterion of total phospholipids and is determined in accordance with the determination of lecithin content as directed in "the Japanese Standards of Food Additives".

The invention includes an embodiment of an edible oil and/or fat which meet the following chemical composition requirements.

(a) the weight ratio of diglycerides to monoglycerides is within the range of 5:1 to 990:1;
(b) the content of diglycerides in the entire oil is within the range of 5 to 100% by weight, favorably 8 to 80% by weight;
(c) the fatty acid residues of mono-, di- and triglycerides have each 8 to 24 carbon atoms.

A more preferred requirement is:

The invention includes an embodiment of an edible oil and/or fat which meet the following chemical composition requirements.

(a) the weight ratio of diglycerides to monoglycerides is within the range of 5:1 to 990:1;
(b) the content of diglycerides in the entire oil is within the range of 5 to 100% by weight, favorably 8 to 80% by weight;
(c) the fatty acid residues of mono-, di- and triglycerides have each 8 to 24 carbon atoms, and the content of unsaturated fatty acid residues amounts to 70% by weight or more of the content of the fatty acid residues; and
(d) the content of diglycerides having in combination a saturated acid and an unsaturated fatty acid is up to 40% by weight, the content of diglycerides having in combination two saturated fatty acids is up to 5% by weight, and the content of diglycerides having in combination two unsaturated fatty acids is the rest.

If the content of diglycerides is smaller than 5% by weight makes the solubility of the phospholipid is insufficient. High content of diglycerides in combination with high content of monoglycerides in the glycerides mixture have a tendency to emit smoke on heating, and thus a suitable content of diglycerides is within the range of 8 to 80% by weight. Like diglycerides, monoglycerides have an effect to increase the solubility of phospholipids. Unlike diglycerides, however monoglycerides, even in low content (if higher than 10% by weight) in oil phase, are involved in emitting much smoke on heating. Accordingly, the content of the monoglycerides in glyceride mixture should be up to 10% by weight, favorably up to 2% by weight.

Although butter, shortenings, lard, or the like are used extensively as edible oil/fat compositions, as described above, new edible oil/fat compositions meeting the aforesaid requirements with respect to cooking characteristics (stability against oxidation) and digestion characteristics (produce no oily distastefulness) are still desired to a great extent in the present situation.

The oils and fats according to the present invention have in the glyceride composition, the following features:

(a) Weight ratio of diglycerides to monoglycerides is within the range of 5:1 to 990:1;
(b) The content of diglycerides in the entire oil is within the range of 5 to 100% by weight;
(c) the fatty acid residues of diglycerides have 8 to 24 carbon atoms, and
(d) the content of diglycerides having in combination a saturated acid and an unsaturated fatty acid is 40% by weight or higher, the content of diglycerides having in combination two saturated fatty acids is 5% by weight or higher, and the content of diglycerides having in combination two unsaturated fatty acids is the rest.

Suitable glyceride mixtures for use in the present invention include oils or fats having an elevated content of diglycerides obtained either by the interesterification of the mixture of glycerol with at least one oil or fat having a high content of unsaturated fatty acid residues selected from the group consisting of safflower oil, olive oil, cottonseed oil, rapeseed oil, corn oil, soybean oil, palm oil, rice (bran and germ) oils, sunflower oil, sesame oil, lard, beef tallow, fish oil, butter, and fractionated, randomized and interesterified oils of them, or by the esterification of glycerol with unsaturated fatty acids derived from the oils or fats; and also include mixtures of the obtained oils or fats having an elevated content of diglycerides with the above-mentioned raw oils or fats.

Surplus monoglycerides produced by the interesterification or esterification can be removed by molecular distillation or chromatography. Although these reactions can be accomplished by other chemical reactions by the use of an alkaline catalyst, or the like, it is favorable for yielding edible oils having good taste and flavor according to the invention that the reaction is made under moderate conditions, for example, with an enzyme, such as 1- and 3-site selective lipase.

Another process for increasing the content of diglycerides in the glyceride mixture is, for example, to use fractionated oils from natural edible oils. This process is appropriated for natural oils or fats having relative high content of unsaturated fatty acids because the recovery of lower melting point fractions results in such improvement in resistance to cooling and in such increase in the content of diglycerides in the oils or fats as to be satisfactorily usable in the present invention.

Preferred edible oil/fat compositions according to the invention are obtained by blending the aforesaid edible oils or fats warmed to 60° to 80° C., with 0.1 to 30% by weight, favorably 0.3 to 20% by weight, of a phospholipid containing PA, LPA and/or salts of these, PG or LPI, LPG or LPI.

To the edible oil/fat compositions according to the invention, for the purpose of improving the preventive effect on burning and sticking, anti-spattering effect, and emulsifying effect for the preparation of dressings or mayonnaises, it is permitted to add various types of emulsifiers such as sucrose fatty acid esters, sorbitan fatty acid esters, propylene glycol fatty acid esters, organic acid monoglycerides, polyglycerin fatty acid ester, etc. Also it is allowed to add various antioxidants, seasonings or flavors, nutrient-fortifiers, consistency-reducing agent, etc.

A further feature of the edible oil/fat according to the invention is to have good solubility for such sparingly soluble emulsifiers that are insoluble or become insoluble and thus separate from in common oils as time passes.

The edible oil/fat compositions according to the present invention have advantages good mold releasing effect and superior anti-spattering effect, and good taste and flavor, and heating causes neither coloration nor emitting of bad smells. Thus, the edible oil/fat compositions have very extensive uses. They can be easily digested and they contribute to non-greasy, dry taste. Accordingly, they are appropriate for the fashion of non-greasy taste in these days while there is a tendency for the intake of oil to be increasing.

In the invention, a liquid alcohol, such as, ethyl alcohol and glycerol, may be added to the composition to obtain an edible oil and fat composition for spraying.

EXAMPLES

The invention will be described more fully for making clearer the effects of it by way of Examples by which the invention is not limited.

Moreover "%" means % by weight unless otherwise specified.

REFERENCE EXAMPLES 1 TO 3

With vegetable oils shown in Table 1 as source oils, diglyceride mixtures 1 through 3 shown in Table 1 were obtained in the following procedure: The fatty acid (860 g) obtained from a vegetable oil under the action of a commercially available preparation of fixed 1- and 3-position selective lipase (Trade mark: Lipozyme 3A; Novo Industry A.S.) was allowed to react with glycerin (140 g) at 40° C. After completion of the reaction, the reaction product was filtered to remove the used lipase, subjected to molecular distillation, and purified according to normal method with a yield of diglyceride mixture.

TABLE 1

| | Diglyceride mixtures | | |
|---|---|---|---|
| | Ref. Ex. No. | | |
| | 1 | 2 | 3 |
| Source | Rapeseed oil | Corn oil | Soybean oil |
| Composition[4] (%) | | | |
| TG[1] | 18 | 15 | 63 |
| DG[2] | 80 | 70 | 35 |
| MG[3] | 2 | 15 | 2 |
| Unsaturated fatty acid content (%) | 92.8 | 85.1 | 85.9 |

Notes:
[1]TG: Triglyceride
[2]DG: Diglyceride
[3]MG: Monoglyceride
[4]Figures indicate contents (%) through gas chromatography

EXAMPLES 1 TO 6

To each of the diglyceride mixtures obtained in Reference Examples 1 to 3 and given in Table 1 were added a vegetable oil and a lecithin, and they were mixed to prepare edible oils; The glyceride compositions and the contents of unsaturated fatty acids are summarized in Table 2.

Fatty acid compositions of phospholipids are given in Table 3.

TABLE 2

Glyceride compositions and storage stabilities of cooking oil compositions

| | (A) Product of the invention (Example No.) | | | | |
|---|---|---|---|---|---|
| | 1 | 2 | 3 | 4 | 5 |
| Glyceride mixture* No. | 1 | 2 | 1 | 2 | 3 |
| (parts) | (20) | (50) | (80) | (50) | (25) |
| Edible oil or fat | Safflower oil | Corn oil | Corn oil | Soybean oil | Cottonoil |
| (parts) | (80) | (50) | (20) | (50) | (75) |
| Glyceride[4] composition (%) | | | | | |
| TG[1] | 84.6 | 59.0 | 33.4 | 57.5 | 79.9 |
| DG[2] | 15.0 | 40.0 | 65.0 | 35.5 | 19.8 |
| MG[3] | 0.4 | 1.0 | 1.6 | 7.0 | 0.3 |
| Content of unsaturated fatty acid (%) | 50.0 | 86.3 | 90.8 | 85.2 | 76.0 |
| Phospholipid sample No. (See Table 3)[5] | 2 | 3 | 4 | 5 | 5 |
| State after 3 month' storage at 20° C. | Uniform Good | Uniform Good | Uniform Good | Uniform Good | Uniform Good |

| | (B) | | | |
|---|---|---|---|---|
| | | Comparative product | | |
| | 6 | 1 | 2 | 3 |
| Glyceride mixture* No. | 3 | — | — | — |
| (parts) | (100) | | | |
| Edible oil or fat | — | Safflower oil | Corn oil | Cotton oil |
| (parts) | | (100) | (100) | (100) |
| Glyceride[4] composition (%) | | | | |
| TG[1] | 63.0 | 98.9 | 99.1 | 99.4 |
| DG[2] | 35.0 | 1.0 | 0.8 | 0.5 |
| MG[3] | 2.0 | 0.1 | 0.1 | 0.1 |
| Content of unsaturated fatty acid (%) | 85.9 | 86.4 | 84.8 | 76.1 |
| Phospholipid sample No. (See Table 3)[5] | 5 | 1 | 3 | 5 |
| State after three months storage at 20° C. | Uniform Good | Phospholipid Precipitate | Phospholipid Precipitate | Phospholipid Precipitate |

*Diglyceride mixture obtained in Reference Examples 1 to 3.
[1]TG: Triglyceride
[2]DG: Diglyceride
[3]MG: Monoglyceride
[4]Figures (%) indicate values through chromatography.
[5]Each phospholipid is added to diglyceride mixtures and edible oils by 5.0 wt. %.

Fatty acid composition of diglycerides

| | Example No. | | | | | |
|---|---|---|---|---|---|---|
| | 1 | 2 | 3 | 4 | 5 | 6 |
| SS (%) | 0.2 | 0.8 | 0.2 | 0.9 | 1.0 | 0.9 |
| SU (%) | 13.5 | 20.4 | 14.3 | 19.3 | 22.3 | 23.1 |
| UU (%) | 86.3 | 78.8 | 83.4 | 82.8 | 76.7 | 76.0 |
| Diglyceride mixture (from | 1 rapeseed | 2 corn | 1 rapeseed | 2 corn | 3 soybean | 3 soybean |

TABLE 2-continued

Glyceride compositions and storage stabilities of cooking oil compositions

Table 1)

TABLE 3

Compositions of phospholipid mixtures

| | Sample No. | | | | |
|---|---|---|---|---|---|
| | 1 | 2 | 3 | 4 | 5 |
| Source | Soybean lecithin | | | | |
| Acetone-insoluble matter[1] (%) | 95.9 | 97.2 | 96.8 | 96.2 | — |
| PC content[2] (%) | 21.7 | 12.5 | 3.0 | 1.1 | 0.0 |
| PE content[3] (%) | 18.8 | 16.0 | 12.5 | 3.6 | 0.1 |
| PA + LPA content[4] (%) | 12.9 | 25.3 | 48.7[5] | 58.6[6] | 98.9 |

Notes:
[1]Acetone-insoluble matter Determined in accordance with the determination of lecithin content as directed in "the Japanese Standards of Food Additives".
[2]PC (phosphatidyl choline) content (wt. %) determined according to Journal of the Japan Oil Chemist's Socienty (Yukagaku), 35(12), 1018–1024, 1988, taking PC molecular weight as 773.
[3]PE (phosphatidyl ethanolamine) content (wt. %) determined according to the above (2), taking PE molecular weight as 728.
[4]PA (phosphatidic acid) and LPA (lysophosphatidic acid) content (wt. %) determined according to the above (2), taking molecular weights of PA and LPA as 704 and 444, respectively.
[5]Mixture of PA (48.6%) and LPA (0.1%)
[6]Mixture of PA (55.6%) and LPA (1.0%)

With oils obtained in Examples and Comparative Examples, chow meins and French dressings were made, and organoleptic tests of them for taste/flavor and "sitting heavy in the stomach" were carried out by 30 panel members. The obtained results were summarized in Table 4.

TABLE 4

Organoleptic function of chow mein and French dressing

| | Chow mein*1 | | French dressing*2 |
|---|---|---|---|
| Used oil or fat | Light taste/ flavor*3 | Sitting heavy in the stomach after meal*4 | Light taste/ flavor*5 |
| Example 1 | 4.2 | 0/30 | 4.5 |
| Example 2 | 4.1 | 1/30 | 4.3 |
| Comp. Exmp. 1 | 1.4 | 18/30 | 2.1 |
| Comp. Exmp. 2 | 1.4 | 22/30 | 1.8 |

Notes:
Comp. Exmp. = Comparative example
*1Chow mein each serving Pork 50 g, cabbage 50 g, bamboo shoot 25 g, onion 25 g, Japanese mushroom (Chochinellus shiitake) 15 g, oil 30 g, and Chinese noodles 180 g.
*2French dressing Oil 180 g, wine vinegar 100 g, salt, and pepper This French dressing 50 g was applied to 30 g of shredded cabbage, and then test was made.
*3 and *4Taste/flavor and sitting heavy on the stomach Each panel member took chow mein (one portion) without leaving, and taste/flavor was evaluated directly after meal, and whether or not sense sitting heavy on the stomach during 4 hours. The evaluations were made using the following 5-grade scale of lightness: 5 = Marked, 4 = Moderate, 3 = Questionable, 2 = Little and 1 = No. The results were indicated as average value of scores by 30 panel memb ers in Table 2. Evaluation of sitting heavy in the stomach was made on whether "Yes" or "No", and N/30 (where N is the number of "Yes") was indicated in Table 2. The evaluation was made of one sample every day.
*5Taste/flavor Each panel member took the cabbage on which French dressing was spread (one portion) without leaving, and taste/flavor (sitting light in the stomach) was evaluated in the same way as in the evaluation of chow mein.

REFERENCE EXAMPLES 4 AND 5

Fatty acids (860 g) obtained from rapeseed oil under the action of a commercially available preparation of fixed 1-and 3-site selective lipase (Trade mark: Lipozyme 3A; Novo Industry A.S.) was allowed to react with glycerin (140 g) at 40° C. for 10 hours. After completion of reaction, the reaction product was filtered to remove the used lipase, subjected to molecular distillation, and purified according to normal procedure with a yield of an oil (A) which has a composition: monoglyceride 2.0%, diglyceride 80.0%, triglyceride 18.0%, and the proportion of unsaturated fatty acids to total fatty acids in the sum of these glycerides was 89.3%.

The obtained oil (A) was mixed with rapeseed oil and safflower oil, respectively, to prepare edible oils which are indicated in Table 5 as Reference Example 4 and 5. Table 5 shows glyceride compositions and unsaturated fatty acid contents of these oils and rapeseed oil and safflower oil for comparison.

TABLE 5

Compositions of edible oils

| | | Glyceride composition (%) | | | Unsaturated fatty acid |
|---|---|---|---|---|---|
| Sample No. | Content | MG*1 | DG*2 | TG*3 | content (%) |
| Ref. Example No. 4 | Oil/fat (A): rapeseed oil (3:2 ratio by weight)-mixed oil | 1.2 | 50.3 | 48.5 | 87.6 |
| Ref. Example No. 5 | Oil/fat (A): safflower oil (3:2 ratio by weight)-mixed oil | 1.1 | 31.3 | 67.6 | 91.8 |

Notes:
*1MG: Monoglyceride
*2DG: Diglyceride The composition is as follows: SS (Sum of glycerides each having saturated fatty acid only as constituents of them) 0.2%, SU (Sum of glycerides each having saturated and unsaturated fatty acids as constituents of them) 13.5%, and UU (Sum of glycerides each having unsaturated acid only as constituents of them) 86.3%.
*3TG: Triglyceride

EXAMPLES 7 AND 8

Transphosphatidilation between soybean lecithin and glycerol was made in the presence of phospholipase, and of the obtained phospholipid mixtures (compositions of which are indicated in Table 6), each (2 g) was dissolved in previously warmed (80° C.) edible oils prepared in Reference Examples 4 and 5, respectively, (100 g), and·then sharply cooled to obtain pasty oil/fat compositions (Examples 7 and 8. High purity soybean lecithin (acetone insoluble matter 95% or more) 2 g was used, and a pasty shortening (Comparative Example 4) were prepared in the same procedure.

Cooking tests of these oil/fat compositions were carried out with an iron frying pan for evaluation of them, and the obtained results are shown in Table 7.

TABLE 6

Compositions of phospholipid mixers used in Examples 7 and 8 and high purity soybean lecithin used in Comparative Example 4

| | Content | | |
|---|---|---|---|
| Component | Example 7 | Example 8 | Com. Exmp. 4 |
| PC[1] | 3.3 | 0.5 | 23.3 |
| PE[1] | 10.1 | 2.8 | 21.0 |
| PI[1] | 13.4 | 15.3 | 8.5 |
| PG[1] | 22.9 | 28.3 | 0 |
| PA[1] | 16.0 | 19.5 | 9.3 |
| PS[1] | 0 | 0 | 0 |
| PA + PG + PI/ PC + PE + PS | 3.9 | 21.0 | 0.38 |

TABLE 6-continued

Compositions of phospholipid mixers used in
Examples 7 and 8 and high purity soybean
lecithin used in Comparative Example 4

| | Content | | |
|---|---|---|---|
| Component | Example 7 | Example 8 | Com. Exmp. 4 |
| N/P² | 0.07 | 0.02 | 0.27 |

NOTES:
In Table 6, the following acronyms are used PC phosphatidyl choline, PE phosphatidyl ethanolamine, PI phosphatidyl inositol, PG phosphatidyl glycerol, PA phosphatidic acid, and PS phosphatidyl serine, respectively.
¹Contents of PC, PE, PI, PG, PA and PS: Determined according to Journal of the Japan Oil Chemist's Society (Yukagaku), 35(12), 1018–1024, 1986, taking molecular weights as PC 773, PE 728, PI 866, PG 778, PA 704 and PS 791, respectively.
²P and N were determined by the phosphomolybdic acid method and Kjeldahl method, respectively.

TABLE 7

N and P contents of O/F compositions yielded
in Examples 7 and 8 and Comparative Example 4,
and evaluation results of dishes
Evaluation of dishes (frizzled rice)⁽³⁾

| Constituent | Example 7 | Example 8 | Comp. Exmp. 4 |
|---|---|---|---|
| Burned | Little | No | Yes |
| Heating-smelled | No | No | Yes, badly |
| Spattered | No | No | A little |
| Colored | Little | No | Markedly |
| Taste/flavor | Good | Good | Lecithin smell acrid taste |

⁽¹⁾Determined by the phosphomolybdic acid method.
⁽²⁾Determined by ICP.
⁽³⁾In an iron frying pan (24 cm) were placed an O/F composition (9 g), Welsh onion (10 g), and egg (40 g), and heated. Subsequently cool cooked rice (300 g) together with these were fried and then seasoned with table salt (1 g) and soy (2.5 ml).

REFERENCE EXAMPLE 6

A natural oil or fat (75 parts by weight) was mixed with glycerin (25 parts by weight). To the mixture, calcium hydroxide (0.1 part by weight) was added, and then interesterification was carried out. The reaction product was subjected to molecular distillation to remove monoglycerides as much as possible. By this procedure, two diglyceride mixtures 1 and 2 were obtained at a yield of 40 parts, respectively.

Of the obtained diglyceride mixtures, respective compositions (% by weight), rising melting points (°C.), and contents of di-unsaturated diglycerides (% by weight) are shown in Table 8.

TABLE 8

| | Mixture 1 | Mixture 2 |
|---|---|---|
| Source | Palm oil | Palm kernel oil |
| Composition (%) | | |
| Triglyceride | 20 | 18 |
| Diglyceride | 78 | 80 |
| Monoglyceride | 2 | 2 |
| Rising melting point (°C.) of diglyceride | 46.2 | 57.2 |
| Content (%) of unsaturated fatty acid residues to total fatty acid residues in diglycerides | 50.2 | 1.0 |
| Rising melting point (°C.) of diglyceride mixture | 45.0 | 56.3 |
| Content (%) of unsaturated diglycerides in diglyceride mixture | 20 | 0 |

Subsequently, with these glyceride mixtures, oils or fats (shown in Table 9) and solid fats and phospholipid mixtures (shown in Table 3), edible oil and/or fat compositions were prepared according to the following procedure: A glyceride mixture was mixed with an oil or fat and dissolved with heating to prepare homogenous oil or fat. To the resulting oil or fat, a solid fat and a phospholipid mixture were added to obtain an edible oil or fat.

Glyceride compositions and contents of unsaturated fatty acids of the thus-obtained edible oils or fats are given in Table 9.

TABLE 9

Oil and/or fat compositions (Examples 9 through 15)

| | Example | | | | | | |
|---|---|---|---|---|---|---|---|
| | 9 | 10 | 11 | 12 | 13 | 14 | 15 |
| Oil and/or fat composition | | | | | | | |
| DG mixture No. | 1 | 1 | 1 | 1 | 2 | 2 | 2 |
| Parts by weight | 20 | 40 | 80 | 40 | 40 | 40 | 40 |
| Hardened fish oil (MP 29° C.) | 30 | | | 10 | | | |
| Hardened fish oil (MP 35° C.) | 40 | 50 | 40 | 50 | | | |
| Hardened rapeseed oil (MP 24° C.) | | | | | 10 | 20 | 20 |
| Hardened rapeseed oil (MP 35° C.) | | | | | 50 | | |
| Rapeseed oil | 10 | | | | | | |
| Shirashime oil | | | | | | | |
| Trans-hard butter (MP 35° C.) | | | | | | 40 | |
| Cacao fat (MP 33° C.) | | | | | | | 40 |
| Composition (%) | | | | | | | |
| Triglyceride | 83.6 | 67.2 | 50.8 | 66 | 67.2 | 67.2 | 67.2 |
| Diglyceride | 16 | 32 | 48 | 28 | 32 | 32 | 32 |
| Monoglyceride | 0.4 | 0.8 | 1.2 | 6.0 | 0.8 | 0.8 | 0.8 |
| Content of diunsaturated diglyceride in oil and/or composition | 14.8 | 30 | 45 | 27.2 | 30 | 30 | 30 |
| Phospholipid mixture No.* | 2 | 3 | 4 | 5 | 5 | 5 | 5 |

*Each number corresponds to sample Nos. of phospholipid in Table 3. 5.0 wt. % of the phospholipid was used per the composition.

Each oil or fat composition (Examples 9 through 15) in Table 9 was applied to a frying pan and tested for cooking characteristics in the same way in Examples 7 and 8.

None of burning and sticking, smell on heating, spattering, and production of color was noted. Any obtained dish had very good taste and flavor.

EXAMPLES 16 TO 18

Twenty percent by weight of 99.5% ethyl alcohol was added to each of the compositions 1, 2, 3 of the invention and the control compositions 1, 2 and 3, shown in Table 2, to obtain compositions of the invention 16, 17 and 18 and then control compositions 5, 6 and 7, respectively. Each composition was determined in view of appearance at 10 degree C. and then after stored for one week, a viscosity at 10 degree C. and spraying property. The viscosity was determined with Rotovisco NV-St, a tradename of a rotor of HAAKE Company. The spraying property was determined by charging a pumping spray with each composition and spraying it at 10 degree C. Results are shown in Table 10. It is seen in the results that the compositions of the invention can be kept uniform and are good in storage, have a low viscosity of 32 to 40 cps and are good at spraying. The control compositions, on the other hand, offer separation from ethyl alcohol, have an undesirably high viscosity and are not good at spraying, merely giving a stream of liquid.

TABLE 10

|  | invention | | | control | | |
|---|---|---|---|---|---|---|
|  | 16 | 17 | 18 | 5 | 6 | 7 |
| appearance at 10 degree C. in 1 week | uniform good | | | ethyl alcohol separated | | |
| viscosity (sp) at 10 degree C. | 34 | 32 | 35 | 61 | 63 | 62 |
| spraying property 10 degree C. | good | | | not good | | |

We claim:

1. An edible composition which consists essentially of an admixture of from 0.1 to 30 wt. % of a phospholipid component and from 20–99.9 wt. % of a glyceride component, said glyceride component consisting essentially of 5 to 100 percent by weight of diglycerides, based on the weight of said glyceride component, up to 10 percent by weight of monoglycerides, based on the weight of said glyceride component, and the balance is triglycerides, the ester-forming groups of said glyceride component being saturated or unsaturated aliphatic acyl groups having from 8 to 24 carbon atoms, with the provisos that at least 70 percent of said acyl groups are unsaturated acyl groups, and when the glyceride component contains monoglycerides, the weight ratio of said diglycerides to said monoglycerides is from 5/1 to 990/1, said phospholipid component having the following formula (I) in which (1) A is hydrogen or $R_2$, (2) $R_1$ and $R_2$ each is an aliphatic acyl group, saturated or unsaturated, having 8 to 24 carbon atoms, (3) $X_1$ is selected from the group consisting of base residues of choline, ethanolamine, serine, inositol, and glycerol, hydrogen, an alkali metal, an alkaline earth metal, a trivalent metal and ammonium, and (4) $X_2$ is selected from the group consisting of hydrogen, an alkali metal, an alkaline earth metal, a trivalent metal and ammonium, and the phospholipid component has a weight ratio of phospholipid having no nitrogen in $X_1$ and $X_2$ to phospholipid having nitrogen in $X_1$ and $X_2$ of 1.0 or more.

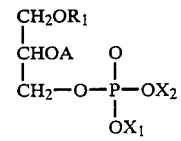

(I)

2. A composition which consists essentially of from 0.1 to 50 percent by weight of ethyl alcohol and the balance is a composition as claimed in claim 1.

3. A composition as claimed in claim 1, in which (a) the glyceride component consists essentially of a mixture of monoglycerides, diglycerides and triglycerides.

4. A composition as claimed in claim 1, in which
(a) the glyceride component consists essentially a mixture of monoglycerides, diglycerides and triglycerides,
and the diglycerides contains 40 percent by weight or more of diglycerides having both unsaturated and saturated aliphatic acid moieties and 5 percent by weight or more of diglycerides having two saturated aliphatic acid moieties.

5. A composition which consists essentially of from 0.1 to 50 percent by weight of ethyl alcohol and the balance is a composition as claimed in claim 4.

6. A composition as claimed in claim 1, in which the phospholipid component has a weight ratio of nitrogen to phosphorus in the range between zero and 0.20.

7. A composition as claimed in claim 1, in which the phospholipid component contains phosphatidic acid (PA) and/or a phosphatidic acid salt and lysophosphatidic acid (LPA) and/or the lysophosphatidic acid salt and a weight ratio of the sum of the phosphatidic acid, a salt thereof, lysophosphatidic acid and a salt thereof to the sum of phosphatidyl choline (PC) and phosphatidyl ethanolamine (PE) is 1.0 or above.

8. An emulsion composition which consists essentially of 50 to 99.9 wt. % of the composition as defined in claim 1 and 0.1 to 50 wt. % of water.

9. An edible composition, which consists essentially of an admixture of
I. from 0.1 to 30% by weight of a phospholipid component having the formula

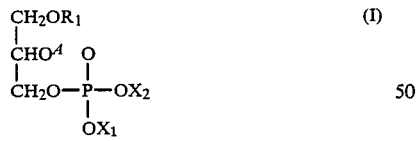

wherein (1) A is hydrogen or $R_2$, (2) $R_1$ and $R_2$ each is a saturated or unsaturated, aliphatic, acyl group having from 8 to 24 carbon atoms, (3) $X_1$ is selected from the group consisting of base residues of choline, ethanolamine, serine, inositol and glycerol, hydrogen, alkali metal, alkaline earth metal, trivalent metal and ammonium, and (4) $X_2$ is selected from the group consisting of hydrogen, alkali metal, alkaline earth metal, trivalent metal and ammonium, with the proviso that the weight ratio of (a) phospholipid having no nitrogen in $X_1$ and $X_2$ to (b) phospholipid having nitrogen in $X_1$ and $X_2$ is at least 1.0, and
II. the balance is a glyceride component, said glyceride component consisting essentially of (a) up to 2 percent by weight of monoglycerides, based on the weight of said glyceride component, (b) from 8 to 80 percent by weight of diglycerides, based on the weight of said glyceride component, and (c) the balance is essentially triglycerides, the ester-forming groups of said glyceride component being saturated or unsaturated, aliphatic, straight-chain, acyl groups having from 8 to 24 carbon atoms, with the proviso that at least 70 percent of said acyl groups are unsaturated acyl groups, and when the glyceride component contains monoglycerides (a), the weight ratio of said diglycerides (b)/monoglycerides (a) is from 5/1 to 990/1.

10. A composition as claimed in claim 9 in which, in said phospholipid component, the weight ratio of nitrogen/phosphorus is from zero to 0.20.

11. A composition as claimed in claim 9 in which, in said glyceride component, said acyl groups have 16 to 18 carbon atoms.

12. A composition as claimed in claim 9 in which said diglycerides (b) consist of (i) up to 40 percent by weight of diglycerides in which the two acyl groups consist of one saturated group and one unsaturated group, (ii) up to 5 percent by weight of diglycerides in which the two acyl groups are both saturated groups, and (iii) the balance consists of diglycerides in which the two acyl groups are both unsaturated groups.

13. An edible glyceride composition consisting essentially of a mixture of monoglycerides, diglycerides and triglycerides in which the ester-forming groups of said glycerides are aliphatic, acyl groups having from 8 to 24 carbon atoms, at least 70 percent of said acyl groups being unsaturated, aliphatic, acyl groups, said mixture contains from 8 to 80 percent by weight of said diglycerides, the weight ratio of said diglycerides to said monoglycerides is in the range of from 5:1 to 990:1, said diglycerides contain 40 percent by weight or more of diglycerides having both unsaturated and saturated, aliphatic, acyl groups and 5 percent by weight or more of diglycerides having two, saturated, aliphatic, acyl groups.

* * * * *